United States Patent [19]

Kitamura et al.

[11] Patent Number: 5,208,711
[45] Date of Patent: May 4, 1993

[54] DATA RECORDING/REPRODUCING APPARATUS HAVING RECORDING HEAD POSITION DETECTION AND CONTROL

[75] Inventors: Shunji Kitamura, Hanno; Katsuhiko Kaida, Mizuho, both of Japan

[73] Assignee: Kabushiki Kaisha Toshiba, Kawasaki, Japan

[21] Appl. No.: 547,204

[22] Filed: Jul. 3, 1990

[30] Foreign Application Priority Data

Jul. 4, 1989 [JP] Japan .................................. 1-172299

[51] Int. Cl.⁵ ........................ G11B 5/55; G11B 19/04
[52] U.S. Cl. .................................. 360/78.04; 360/60; 360/77.05
[58] Field of Search ...................... 360/60, 77.02–77.11, 360/77.01, 77.12–77.17, 78.01, 78.02, 78.04; 369/43, 44.32, 44.33

[56] References Cited

U.S. PATENT DOCUMENTS

| | | | |
|---|---|---|---|
| 4,803,572 | 2/1989 | Haruna et al. | 360/60 |
| 4,839,751 | 6/1989 | Revels | 360/60 |
| 5,005,089 | 4/1991 | Thanos et al. | 360/77.08 |
| 5,095,471 | 3/1992 | Sidman | 360/78.04 |

*Primary Examiner*—Jerry Smith
*Assistant Examiner*—Steven R. Garland
*Attorney, Agent, or Firm*—Finnegan, Henderson, Farabow, Garrett & Dunner

[57] ABSTRACT

In a head driving control apparatus used, for example, in a hard disc drive, a peak detector detects a peak value of a servo signal output from a data head. A CPU detects a thermal off-track distance L of the data head, on the basis of the peak value of the servo signal. When the thermal off-track distance L is within an allowable off-track distance Lw in a data write mode or within an allowable off-track distance Lc in a data read mode, the CPU enables a data write operation or a data read operation. When the thermal off-track distance L is without the allowable off-track distance Lw in the data write mode or without the allowable off-track distance Lc in the data read mode, the CPU prohibits the data write operation or the data read operation.

6 Claims, 13 Drawing Sheets

FIG. 6A  SP
FIG. 6B  FORMAT
FIG. 6C  RG (READ MODE)
FIG. 6D  RG (WRITE MODE)
FIG. 6E  WG
FIG. 6F  WE
FIG. 6G  F

HEAD POSITION

SERVO DATA

| $CHD2^0$ | $CHD2^1$ | $CHD2^2$ | $CHD2^3$ | HEAD NO. |
|---|---|---|---|---|
| 0 | 0 | 0 | 0 | H1 |
| 1 | 0 | 0 | 0 | H2 |
| 0 | 1 | 0 | 0 | H3 |
| 1 | 1 | 0 | 0 | H4 |
| 0 | 0 | 1 | 0 | H5 |
| ≀ | ≀ | ≀ | ≀ | ≀ |
| 0 | 1 | 1 | 1 | H15 |

F I G. 12

| HEAD NO. | OFF-TRACK DISTANCE | LOGICAL NO. OF HEAD |
|---|---|---|
| H1 | +3 μm | LH1 |
| H2 | +2 μm | LH2 |
| H3 | +0 μm | LH5 |
| H4 | -1 μm | LH7 |
| H5 | -2 μm | LH8 |
| H6 | +2 μm | LH14 |
| H7 | +0 μm | LH6 |
| H8 | +1 μm | LH3 |
| H9 | -1 μm | LH11 |
| H10 | -3 μm | LH9 |
| H11 | +3 μm | LH15 |
| H12 | +1 μm | LH4 |
| H13 | +0 μm | LH12 |
| H14 | -2 μm | LH10 |
| H15 | +1 μm | LH13 |

F I G. 13

| $HD2^0$ | $HD2^1$ | $HD2^2$ | $HD2^3$ | HEAD NO. |
|---|---|---|---|---|
| 0 | 0 | 0 | 0 | H1 |
| 1 | 0 | 0 | 0 | H2 |
| 0 | 1 | 0 | 0 | H8 |
| 1 | 1 | 0 | 0 | H12 |
| 0 | 0 | 1 | 0 | H3 |
| 1 | 0 | 1 | 0 | H7 |
| 0 | 1 | 1 | 0 | H4 |
| 1 | 1 | 1 | 0 | H5 |
| 0 | 0 | 0 | 1 | H10 |
| 1 | 0 | 0 | 1 | H14 |
| 0 | 1 | 0 | 1 | H9 |
| 1 | 1 | 0 | 1 | H13 |
| 0 | 0 | 1 | 1 | H15 |
| 1 | 0 | 1 | 1 | H6 |
| 0 | 1 | 1 | 1 | H11 |

FIG. 14

| D0 | D1 | D2 | D3 | D4 | HEAD NO. |
|---|---|---|---|---|---|
| 0 | 0 | 0 | 0 | 1 | H1 |
| 0 | 0 | 1 | 0 | 1 | H2 |
| 0 | 1 | 0 | 0 | 1 | H3 |
| 0 | 1 | 1 | 0 | 1 | H4 |
| 1 | 0 | 0 | 0 | 1 | H5 |
| 1 | 0 | 1 | 0 | 1 | H6 |
| 1 | 1 | 0 | 0 | 1 | H7 |
| 1 | 1 | 1 | 0 | 1 | H8 |
| 0 | 0 | 0 | 1 | 0 | H9 |
| 0 | 0 | 1 | 1 | 0 | H10 |
| 0 | 1 | 0 | 1 | 0 | H11 |
| 0 | 1 | 1 | 1 | 0 | H12 |
| 1 | 0 | 0 | 1 | 0 | H13 |
| 1 | 0 | 1 | 1 | 0 | H14 |
| 1 | 1 | 0 | 1 | 0 | H15 |

FIG. 16

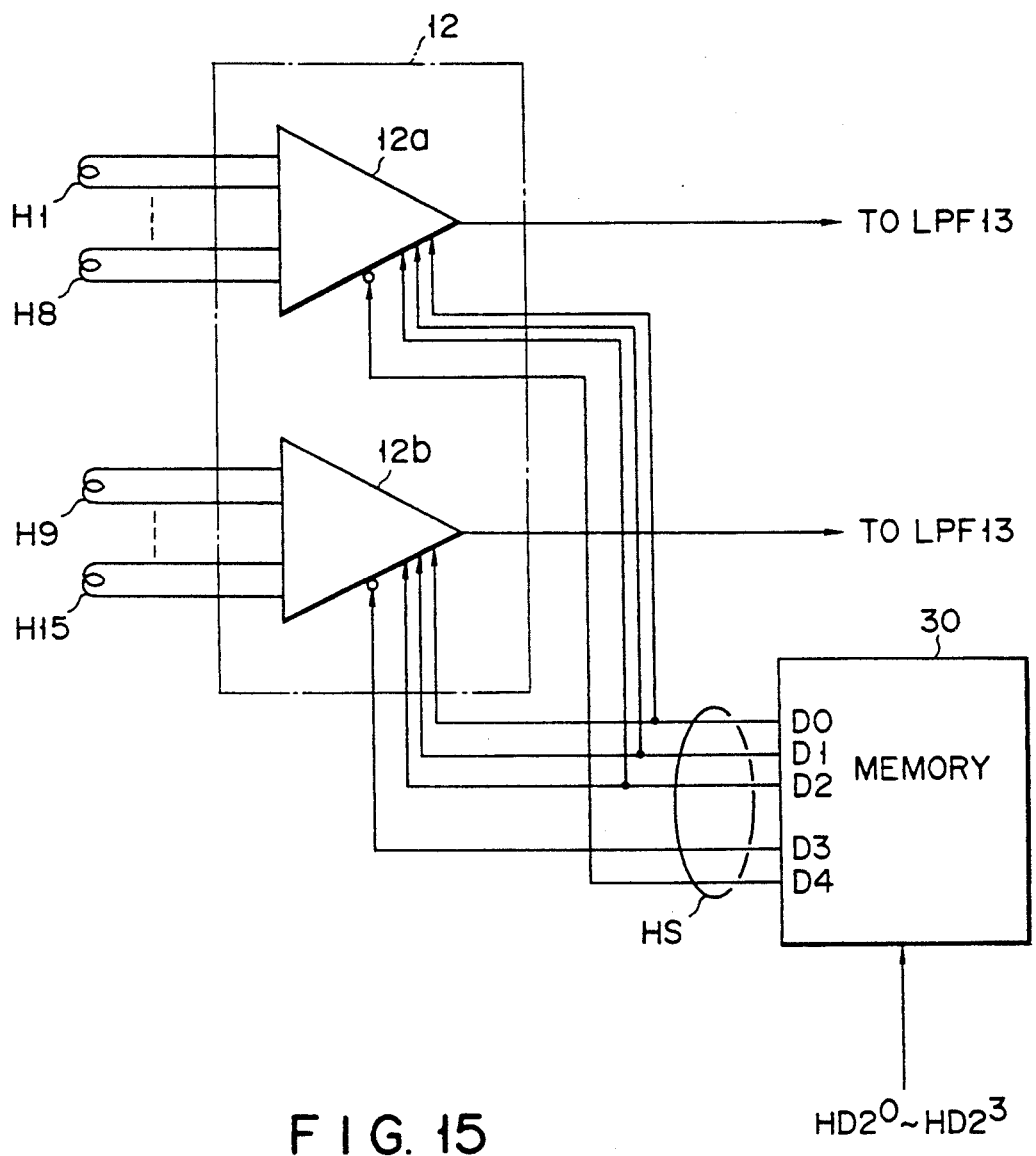
F I G. 15

DATA RECORDING/REPRODUCING APPARATUS HAVING RECORDING HEAD POSITION DETECTION AND CONTROL

BACKGROUND OF THE INVENTION

1. Field of the Invention

The present invention relates to a data recording/reproducing apparatus, such as a hard disc drive (HDD).

2. Description of the Related Art

In a HDD, data heads and a servo head are arranged to face both surfaces of a plurality of recording mediums (discs). The data heads and servo head are simultaneously moved by a head drive mechanism, for seeking in a radial direction of the recording mediums. The servo head reads out servo data recorded on one surface of one of the recording mediums. On the basis of a servo signal output (read out) from the servo head, a servo system circuit enables the servo head to seek a destination track (cylinder) and positions the servo head to a center of the destination track. Following the servo head, the data heads are moved for seeking in the radial direction of the recording mediums and are brought to the centers of destination tracks. Data is recorded/reproduced by means of one of the data heads.

The position of each data head may be displaced relative to the position of the servo head, owing to a temperature change in the space where the HDD is installed. This undesirable phenomenon is called an "off-track phenomenon", or "thermal off-track phenomenon." If the off-track distance (positional displacement) of the data head increases up to about 10% to 15% of the width of a track, exact reproduction of data is made impossible.

In the prior art, when data is written or read, if thermal off-track exceeding a allowable off-track distance occurs, the off-track is corrected by means of a embedded servo system, or the combination of the embedded servo system and a dedicated servo system. Namely, the position of the data head is corrected. In this conventional method, however, a carriage supporting the data heads must be moved, though slightly. This increases time for head positioning, and lowers the throughput of the system using the HDD.

SUMMARY OF THE INVENTION

The object of the present invention is to provide a data recording/reproducing apparatus, wherein, when thermal off-track has occurred, the time taken for a head positioning operation necessary for correcting the thermal off-track can be reduced, and the throughput of the data recording/reproducing apparatus can be increased.

According to one aspect of the present invention, there is provided a data recording/reproducing apparatus, comprising: head position control means for positioning a head to a destination track, on the basis of servo data pre-stored in a recording medium; off-track distance detecting means for detecting an off-track distance L, when the head is positioned by the head position control means to the destination track; comparison means for comparing the off-track distance L detected by the off-track distance detecting means with an allowable off-track distance Lw set in advance at a data write time or an allowable off-track distance Lc set in advance at a data read time; and data write/read control mean for enabling a data write operation when the off-track distance L is within the allowable off-track distance Lw and enabling a data read operation when the off-track distance L is within the allowable off-track distance Lc, and also for prohibiting the data write operation when the off-track distance L is without the allowable off-track distance Lw and prohibiting the data read operation when the off-track distance L is without the allowable off-track distance Lc.

According to another aspect of the invention, the apparatus further comprises head position correction means for correcting the position of the head, when the execution of the data write operation or the data read operation is prohibited by the data write/read control means.

According to still another aspect of the invention, there is provided a data recording/reproducing apparatus, including a plurality of recording mediums storing servo data in advance and a plurality of heads facing the corresponding tracks of equal radial position on the surfaces of the said recording mediums, comprising: head position control means for positioning said heads to destination tracks, on the basis of said servo data; off-track distance detecting means for detecting off-track distances of the heads positioned by the head position control means, in relation to the destination tracks; and head selection control means for determining a selection order of the heads, such that the off-track distance between sequentially used two the heads falls within a predetermined allowable off-track distance, when data is written/read in/from the tracks of equal radial position of the recording mediums by sequentially using the heads on the basis of the off-track distances of the heads detected by the off-track distance detecting means.

With the above structure, the time taken for the head positioning operation necessary for correcting the thermal off-track can be reduced, and the throughput of the data write/read apparatus can be increased.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 6A to 6G are timing charts for explaining the operation of the apparatus of the first embodiment of the invention;

FIGS. 12 to FIG. 14 show the contents of memory tables according to the second embodiment of the invention;

FIG. 15 is a block diagram showing a structure of a memory and a head control circuit according to a second embodiment of the invention;

FIG. 16 shows the relationship between head select signals and head numbers in the second embodiment of the invention.

DETAILED DESCRIPTION OF THE PREFERRED EMBODIMENTS

Embodiments of the present invention will now be described with reference to the accompanying drawings.

Figure 1:
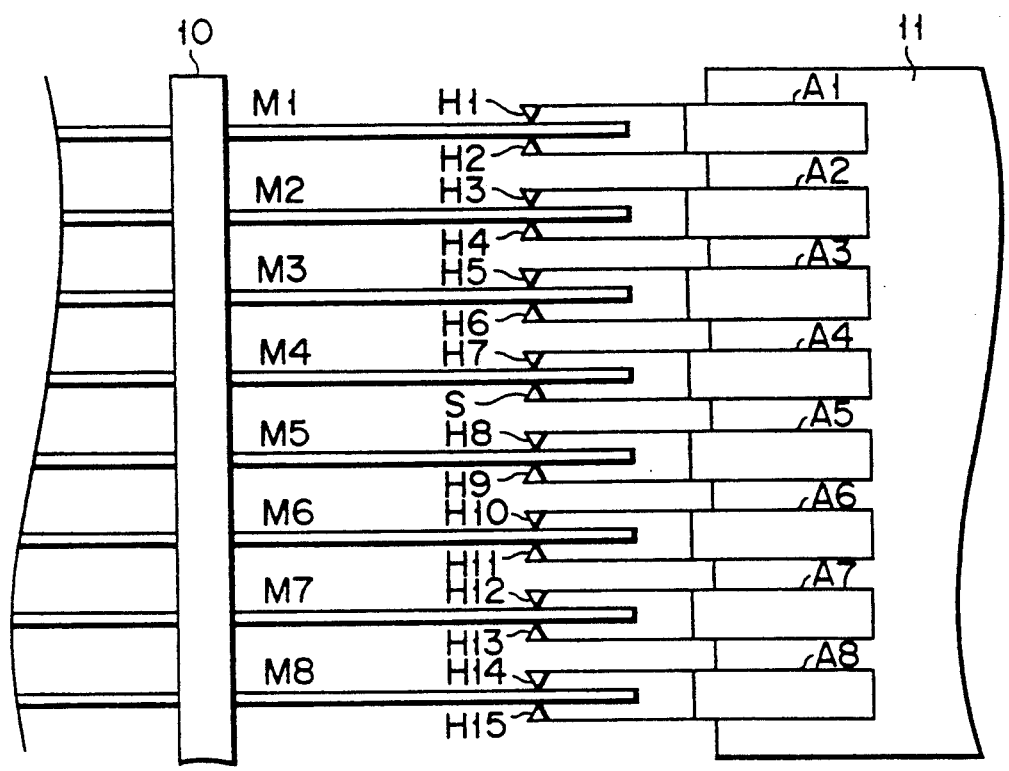
FIG. 1 is a side view showing a structure of a head drive mechanism used in a head driving control apparatus according to a first embodiment of the present invention.

FIG. 1 is a side view showing a structure of a head drive mechanism according to a first embodiment of the present invention. For example, in a hard disc drive (HDD), as shown in FIG. 1, a plurality of recording mediums (discs) M1 to M8 are secured to a spindle 10. The recording mediums M1 to M8 rotate along with the spindle 10. Data heads H1 to H15 and a servo head S are arranged so as to face both surfaces of the recording mediums M1 to M8. The heads H1 to H15 and the servo head S are supported by head arms A1 to A8 attached to a carriage 11. The carriage 11 is driven by a voice coil motor to move the heads H1 to H15 and servo head S for seeking in a radial direction of the recording mediums M1 to M8.

Servo data is recorded in advance on one surface of the recording medium M4. The servo head S reads out the servo data from this surface of the recording medium M4, and outputs the servo data to a servo system circuit. On the basis of a servo signal output from the servo head S, the servo system circuit enables the servo head S to seek up to a destination track (destination cylinder), thereby positioning the servo head S to the center of the destination track. Following the motion of the servo head S, the data heads H1 to H15 are allowed to seek in the radial direction of the recording mediums M1 to M8 and are positioned on the destination tracks. Once the data heads are positioned on the destination tracks, data is recorded/reproduced by means of one of the data heads.

Figure 2:
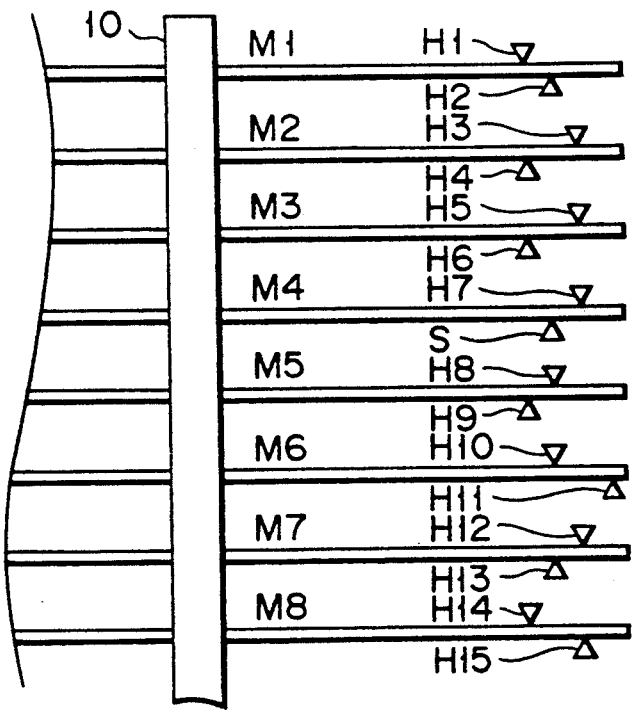
FIG. 2 is a side view showing the structure of the head drive mechanism according to the first embodiment, wherein a thermal off-track phenomenon has occurred.

As is shown in FIG. 2, the position of each data head, H1 to H15, may be displaced relative to the position of the servo head S, owing to a temperature change in the space where the HDD is installed. This phenomenon is called a "thermal off-track phenomenon." If the off-track distance (positional displacement) of the data head, H1 to H15, increases up to about 10% to 15% of the width of a track, exact reproduction of data is made impossible.

Figure 3:
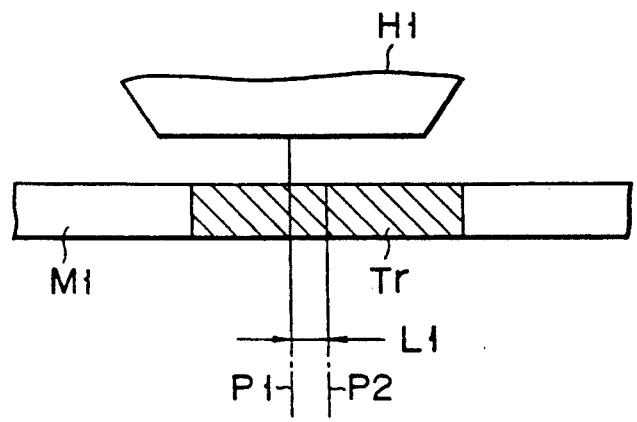
FIG. 3 and FIG. 4 illustrate the relationship between a head and a track in the case of off-track, in the first embodiment of the invention.

Referring to FIG. 3, suppose that data is exactly recorded on a predetermined track Tr of the recording medium M1, and the data head H1 (or head center P1 of the data head H1) is displaced ("off-tracked") from a track center P2 by a distance L1. Now, data is read out from the track Tr. In this case, an allowable off-track distance Lc, which enables data to be read out, can be found experimentally. If the thermal off-track distance L1 is within the range of the allowable off-track distance L, the data can be read out by the data head H1.

Figure 4:
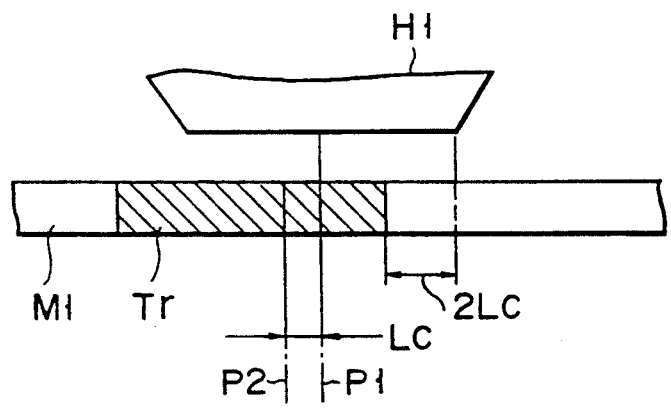

Suppose that, as is shown in FIG. 4, the data head H1 is off-tracked by a distance corresponding to the allowable off-track distance Lc, and data is read on the track Tr. In this case, if a thermal off-track phenomenon occurs in the data read mode, the data head H1 is off-tracked by 2Lc at a maximum. If the data head H1 is off-tracked by 2Lc, data cannot exactly be read from the track Tr. From this fact, it is understood that an allowable off-track distance Lw in the data write mode should desirably be about half the allowable off-track distance Lr (Lc) in the data read mode.

In general, in the data write/read mode, the allowable off-track distance is set to about ½·Lc. When the thermal off-track exceeds the allowable off-track distance of ½·Lc, the off-track is corrected by a embedded servo system or the combination of the embedded servo system and a dedicated servo system. Thus, the head is suitably positioned. Embedded servo data is stored in advance at a predetermined location on the data surface (e.g. an area between sectors in each track). In FIG. 1, the data surface is each of both surfaces of each recording medium M1 to M8, excluding a servo surface of the recording medium M4.

In this head positioning operation, however, it is necessary to move the carriage 11, though slightly. Consequently, much time is taken for the head positioning operation, and the throughput of the system using the HDD lowers. Under the situation, the present invention aims at reducing the time for the head positioning operation, which is required for off-track correction.

Figure 5:
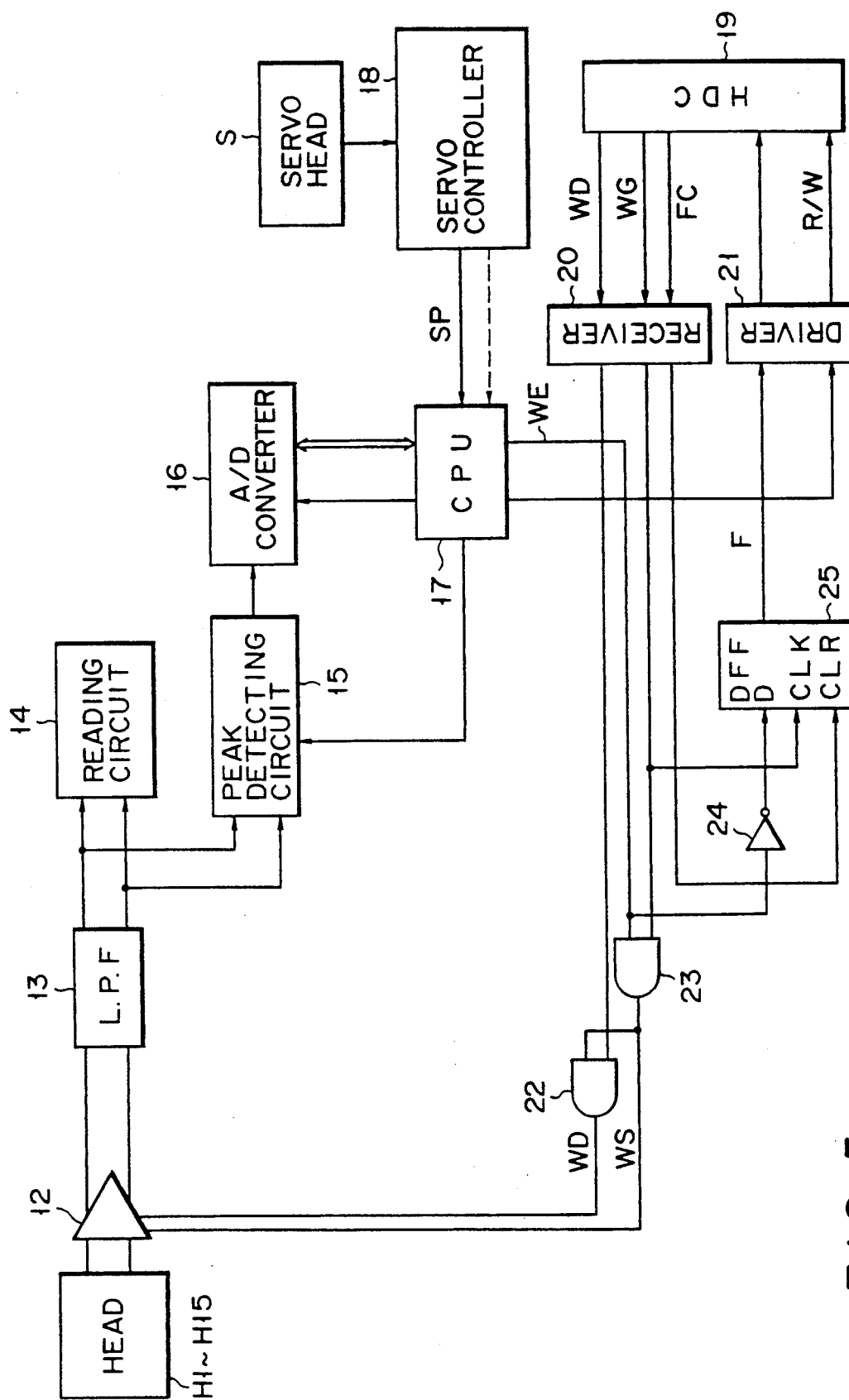
FIG. 5 is a block diagram showing a structure of the head driving control apparatus according to the first embodiment of the invention.

FIG. 5 is a block diagram showing a structure of a head driving control apparatus used in an HDD, according to the first embodiment of the invention. The head driving control apparatus comprises a head control circuit 12 for carrying out read/write control of heads (data heads H1 to H15), a low-pass filter (LPF) 13, and a peak detecting circuit 15. The head control circuit 12 amplifies servo signals (embedded servo data) output from the head, and supplies the amplified signals to the LPF 13. The LPF 13 removes high-band noise from the servo signals, and supplies the filtered signals to the peak detecting circuit 15. In the normal data reproduction mode, the LPF 13 outputs normal data read signals to a reading circuit 14. The peak detecting circuit 15 holds a peak value (level) of the servo signals output from the LPF 13.

An A/D converter 16 converts the peak value of the servo signals held by the peak detecting circuit 15 into digital data, and outputs the digital data to a microprocessor (hereinafter, called "CPU") 17. Based on the peak value of the servo signals output from the peak detecting circuit 15, the CPU 17 carries out head driving control. A servo controller 18 controls the driving of the carriage 11. The servo controller 18 generates sector pulses SP, and processes servo signals (dedicated servo data) output from the servo head S.

A first input terminal of an AND circuit 22 receives write data WD from a hard disc controller (HDC hereinafter) 19, and a second input terminal of the AND circuit 22 receives a write signal WS from an AND circuit 23. The write data WD from the HDC 19 is input to a receiver 20 and then transferred to the AND circuit 22. A first input terminal of the AND circuit 23 receives a write gate signal WG from the HDC 19, and a second input terminal thereof receives a write enable signal WE from the CPU 17. The write gate signal WG from the HDC 19 is input to the receiver 20 and then transferred to the AND circuit 23. Write data WD from the AND circuit 22 and a write signal WS from the AND circuit 23 are output to the head control circuit 12.

An inverter 24 inverts the write enable signal WE from the CPU 17, and outputs the inverted write enable signal WE to a data input terminal D of a D-type flip-flop (DFF) 25. When the write gate signal WG is input to a clock terminal CLK of the DFF 25, if the write enable signal WE from the CPU 17 is false, the DFF 25 outputs fault signal F to the HDC 19 through a driver 21 (see FIGS. 6E to 6G). In addition, a clear terminal CLR of the flip-flop 25 is supplied with a fault clear signal FC from the HDC 19.

FIGS. 6A to 6G are timing charts relating to the embodiment shown in FIG. 5. FIG. 6A shows a sector pulse SP output from the servo controller 18. FIG. 6B shows a data format in the embedded servo system. FIG. 6C shows a read gate signal RG in the read mode of the data output from the HDC 19. FIG. 6D shows the read gate signal RG in the write mode of the data output from the HDC 19. FIG. 6E shows the write gate signal WG output from the HDC 19. FIG. 6F shows the write enable signal WE output from the CPU 17, and FIG. 6G shows the fault signal F output form the flip-flop 25. The read gate signal RG generated in the read mode and the write mode is output from the HDC 19 to the reading circuit 14 through the receiver 20, through not shown.

The operation of the first embodiment of the invention will now be described.

When destination tracks (destination cylinders) for data read/write are determined, the carriage 11 is driven by the servo controller 18. In accordance with the motion of the carriage 11, the servo head S is caused to seek in the radial direction of the recording medium M4. Following the motion of the servo head S, the data heads H1 to H15 are moved and positioned at the destination tracks (see FIG. 1).

In some cases, the data heads H1 to H15 are off-tracked owing to the thermal off-track phenomenon relative to the servo head S, as shown in FIG. 2. According to a widely employed method of correcting the off-track, the carriage 11 is moved by means of the embedded servo system or the combination of the embedded servo system and the dedicated servo system thereby to correct the off-track of the data heads H1 to H15. In the embedded servo system, as is shown in FIG. 6B, servo data is recorded in advance, for example, at a top portion (i.e. embedded servo area corresponding to a gap) of a sector in a track data format.

Figure 7A:
FIGS. 7A and 7B are views for explaining a servo system according to the first embodiment of the invention.
Figure 7B:
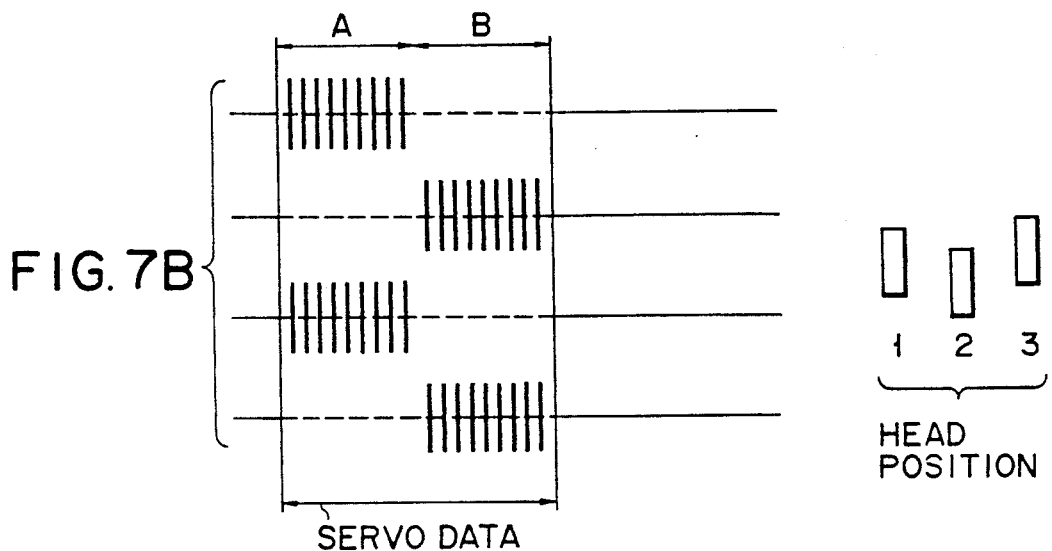
Figure 8A:
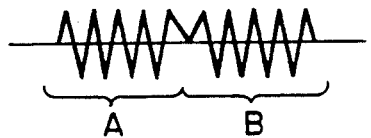
FIGS. 8A to 8C show waveforms of servo signals output from the head according to the first embodiment of the invention.
Figure 8B:
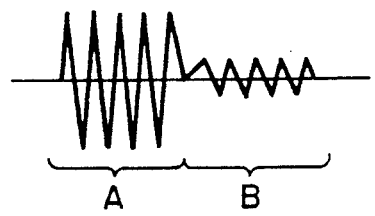
Figure 8C:
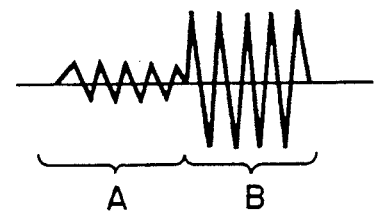

An embedded servo area stores servo data consisting of two patterns A and B, as is shown in FIGS. 7A and 7B. The data heads H1 to H15 read out servo data from the embedded servo area, and outputs the servo data to the head control circuit 12. In this case, the peak value (level) of a servo signal output from the head varies depending on the head positions 1 to 3. Namely, when the head is situated at the center of the track (head position 1), the peak value of the servo signal corresponding to the pattern A is equal to the peak value of the servo signal corresponding to the pattern B, as is shown in FIG. 8A. When the head departs from head position 1 to head position 2, the peak value of the servo signal corresponding to pattern A is greater than that of the servo signal corresponding to pattern B, as is shown in FIG. 8B. When the head is situated in head position 3, the peak value of the servo signal corresponding to pattern B is greater than that of the servo signal corresponding to pattern A, as is shown in FIG. 8C, in contrast to the case of position 2.

When the head reads out the servo data from the embedded servo area, the peak value of the servo signal corresponding to the pattern A is compared with the peak value of the servo signal corresponding to the pattern B. Thus, the distance of the off-track of the head can be calculated. Supposing that the peak value of the servo signal corresponding to the pattern A is $P^A$ and the peak value of the servo signal corresponding to the pattern B is $P^B$, the off-track distance L is given by $$L = C \cdot (P^A - P^B) \quad (1)$$

where C is a constant for converting the peak value of the servo signal to a distance. The value C is determined by experiment or on the basis of theory.

In the present invention, the CPU 17 receives the peak values $P^A$ and $P^B$ of the servo signals from the peak detecting circuit 15 through the A/D converter 16, in synchronism with sector pulses SP from the servo controller 18. On the basis of equation (1), the CPU 17 calculates the current thermal off-track distance L of the data heads H1 to H15.

The operation of this embodiment will now be described with reference to the flowcharts of FIGS. 9 and 10.

Figure 9:
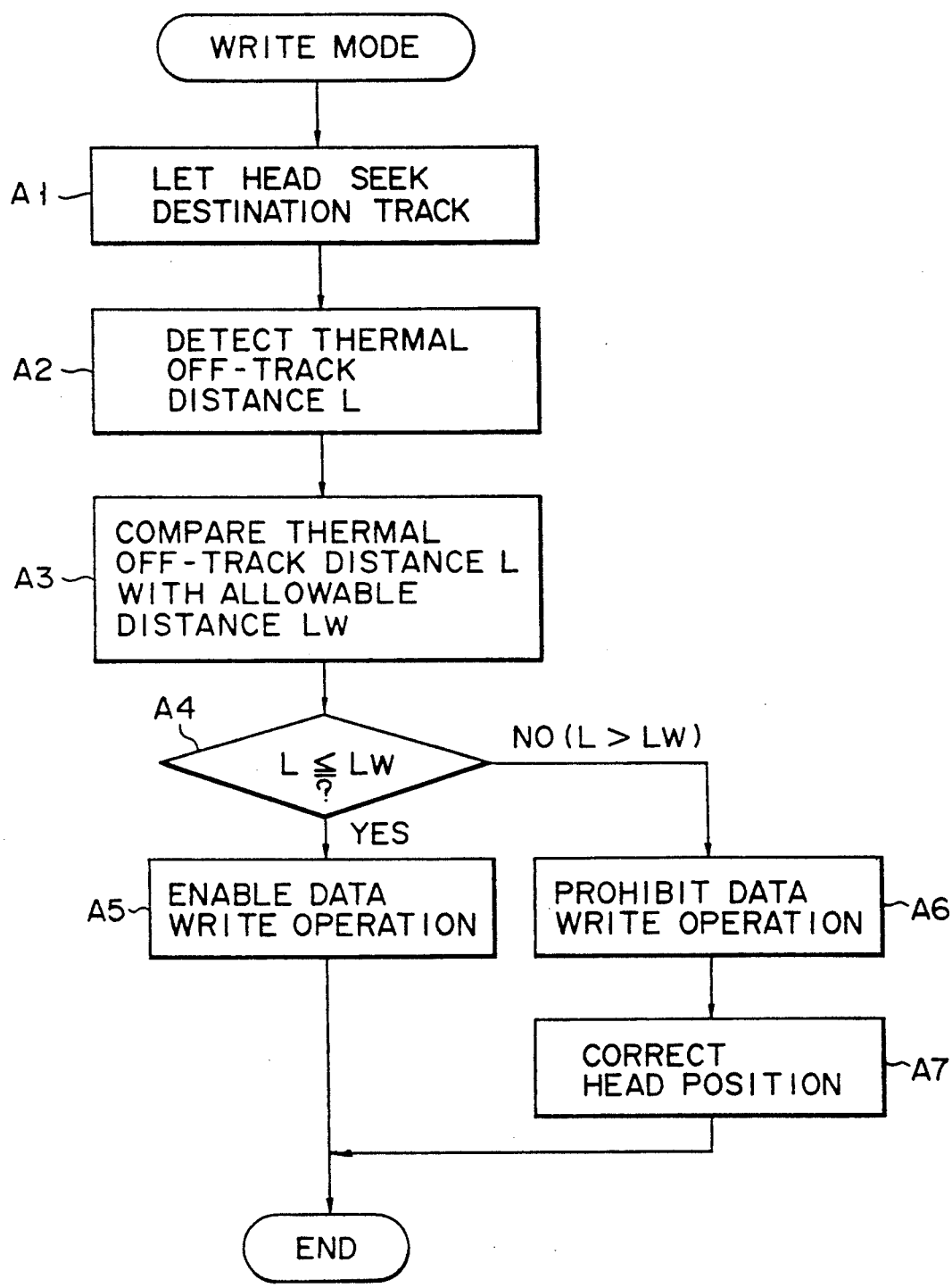
FIG. 9 is a flowchart for explaining a data write mode operation in the first embodiment of the invention.

In the data write mode, as is shown in FIG. 9, the CPU 17 lets the data heads H1 to H15 seek destination tracks (cylinders), and finds thermal off-track distance L by the above method (steps A1 and A2). The CPU stores in advance an allowable off-track distance Lw in the data write mode and an allowable off-track distance Lc in the data read mode. In step A3, the CPU 17 compares the thermal off-track distance L with the predetermined allowable off-track distance Lw in the data write mode. As has been stated above, the allowable off-track distance Lw is half the allowable off-track distance Lc in the data read mode. Namely, $Lw = \frac{1}{2} \cdot Lc$.

When the thermal off-track distance L is equal to or less than the allowable off-track distance Lw (i.e. $L \leq Lw$) (step A4), the CPU 17 outputs the write enable signal WE to the AND circuit 23, thus enabling the data write operation (step A5). When the write gate signal WG is output from the HDC 19, the AND circuit 23 outputs the write signal WS to the head control circuit 12. On the other hand, responding to the write signal WS from the AND circuit 23, the AND circuit 22 outputs the write data WD from the HDC 19 to the head control circuit 12. Upon receiving the write data WD and the write signal WS, the head control circuit 12 enables the data head (one of data heads H1 to H15) to write data on a destination track on the basis of the write data WD.

When the thermal off-track distance L is greater than the allowable off-track distance Lw (i.e. L>Lw) (step A4), the CPU 17 sets the write enable signal WE in a false state (signal level "0"), and prohibits the data write operation (step A6). In this case, the write enable signal WE in the false state from the CPU 17 goes to the flip-flop 25 through the inverter 24. When the write gate signal WG is "1", the write enable signal WE in the false state is set in the flip-flop 25. Thus, the fault signal F is sent from the flip-flop 25 to the HDC 19 through the driver 21. The CPU 17 enables the servo controller 18 to move the carriage 11, thereby positioning the data head to the center of the destination track. Thus, the position of the data head is corrected (step A7).

The head positioning is effected by means of the embedded servo system, or the combination of the embedded servo system and the dedicated servo system. According to the embedded servo system, embedded servo signals are obtained by means of the data heads from the data surfaces (both surfaces of the recording mediums M1 to M8, excluding the servo surface of the recording medium M4). Using the servo signals, the data heads are finely adjusted and positioned to the centers of the destination tracks. By contrast, according to the combination of the embedded servo system and the dedicated servo system, both embedded servo signals obtained by the data heads and a dedicated servo signal obtained by the servo head S from the servo surface (one of the surfaces of recording medium M4) are employed. Thus, the servo head S is finely adjusted, and accordingly the data heads are positioned to the centers of the destination tracks.

Figure 10:
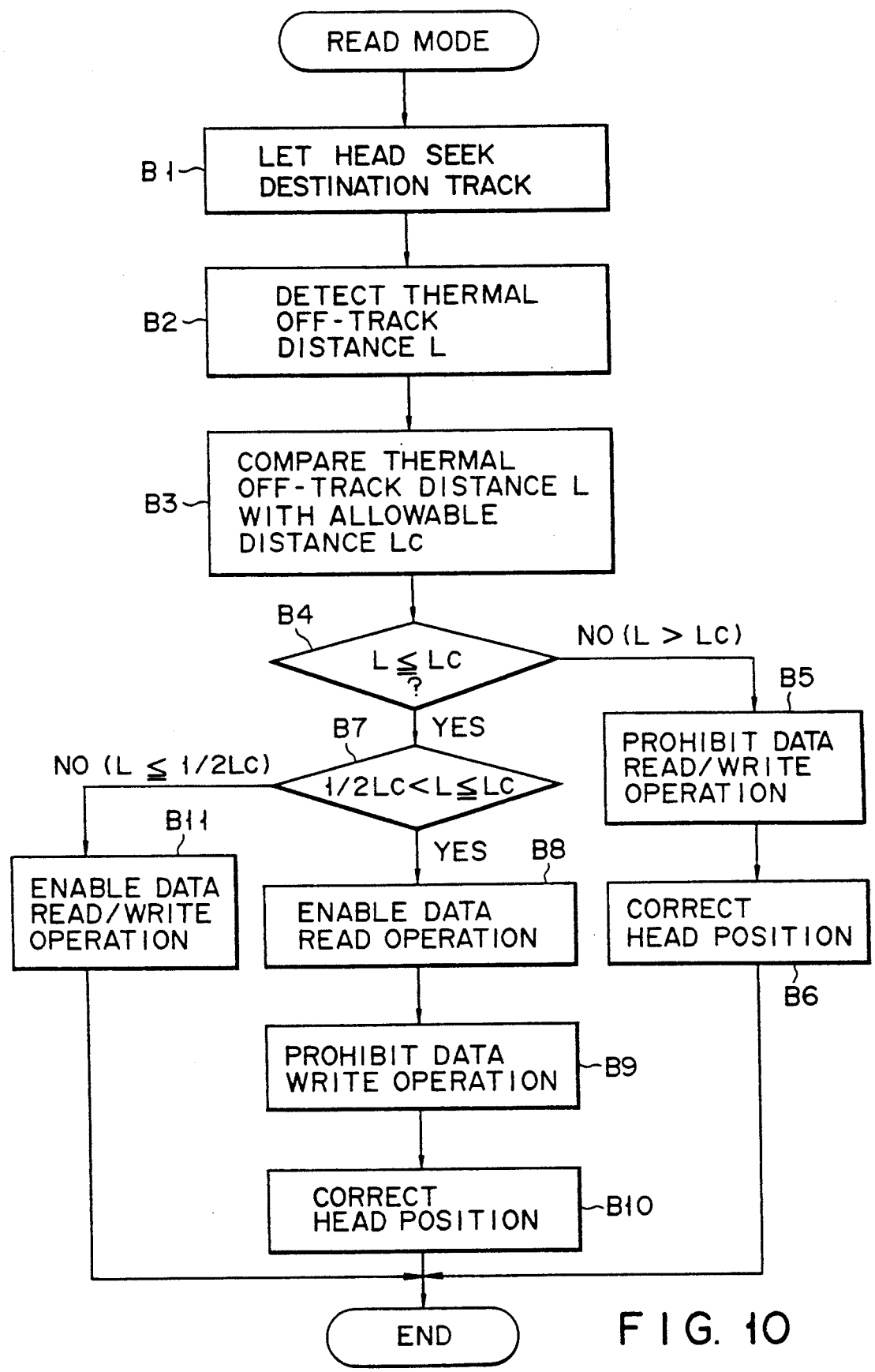
FIG. 10 is a flowchart for explaining a data read mode operation in the first embodiment of the invention.

On the other hand, in the data read mode, as is shown in FIG. 10, the CPU 17 causes the data heads H1 to H15 to seek the destination tracks, and at this time the CPU 17 compares the thermal off-track distance L and the allowable off-track distance Lc in the data read mod (steps B1 to B3).

When the thermal off-track distance L is greater than the allowable off-track distance Lc (i.e. L>Lc) (step B4), the CPU 17 treats the read/write enable signal R/W as a false signal, and supplies it to the HDC 19. Then the HDC 19 prohibits the data write/read operation in the HDD (step B5). In this case, the CPU 17 enables the servo controller 18 to move the carriage 11, by means of the aforementioned the embedded servo system, or the combination of the embedded servo system and the dedicated servo system. Thus, the data heads are positioned to the centers of the destination tracks, and the head positions are corrected (step B6).

When the thermal off-track distance L is equal to or less than the allowable off-track distance Lc and greater than half the allowable off-track distance Lc (i.e. $\frac{1}{2} \cdot Lc$ $(Lw) < L \leq Lc$) (step B7), the CPU 17 outputs the read/write allowable signal R/W and makes the write enable signal WE false. Thus, the CPU 17 enables the data read operation and prohibits the data write operation (steps B8, B9). In the data read mode, as is shown in FIG. 6C, the ADDRESS and DATA of the destination track can be read in response to the read gate signal RG. On the other hand, since the write enable signal WE is made false, the fault signal F is output from the flip-flop 25 and is sent to the HDC 19. Thus, when the data read mode is switched to the data write mode, the HDC 19 is able to confirm that the data write operation has been prohibited and no data has been written.

Subsequently, the CPU 17 moves the carriage 11 to correct the head position (step B10). When the comparison data, $L \leq \frac{1}{2} \cdot Lc$, is attained, the CPU 17 outputs the write enable signal WE. Namely, when $L \leq \frac{1}{2} \cdot Lc$, the CPU 17 outputs both the R/W enable signal and the write enable signal WE, and allows the data write/read operation (step B11).

As has been described above, when the data head is caused to seek the destination track to carry out the data write/read operation, the thermal off-track distance is compared with the allowable off-track distance in each of the data write mode and data read mode. In accordance with the comparison data, it is determined whether the driving control (head positioning control) of the carriage is to be effected. For example, if the off-track distance of the data head is greater than the allowable off-track distance in the data write mode and is equal to or less than the allowable off-track distance in the data read mode, the data read operation is enabled without correcting the off-track by moving the carriage. As a result, the time taken for the head positioning control required for off-track correction can be reduced, and the throughput of the data write/read apparatus can be increased.

A second embodiment of the present invention will now be described.

Figure 11:
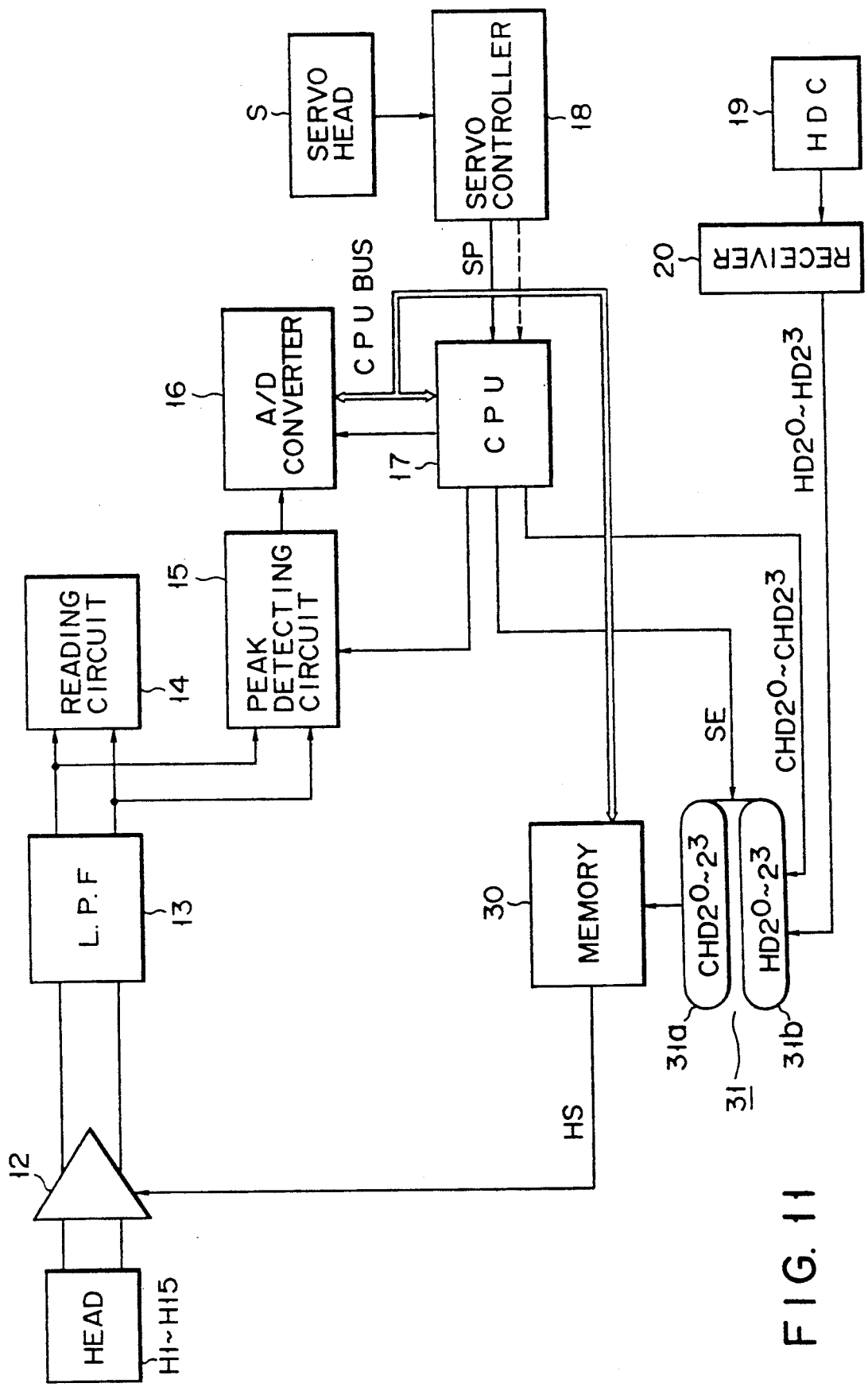
FIG. 11 is a block diagram showing a structure of a head drive control apparatus according to a second embodiment of the invention.

FIG. 11 is a block diagram showing a structure of a head driving control apparatus according to the second embodiment of the invention. In this embodiment, there is provided a memory 30 which is constituted by an EEPROM (Electrically Erasable Programmable Read-Only Memory). The memory 30 stores a table of the relation between a selection signal from a selector circuit 31 and a head number selected by the CPU 17. As shown in FIG. 12, the memory 30 initially stores a table of the relation between head selection signals CHD2$^0$ to CHD2$^3$ and head numbers (physical position numbers). When the CPU 17 outputs "0" level selection signals SE and head selection signals CHD2$^0$ to CHD2$^3$, one circuit 31a of the selector circuit 31 searches the table stored in the memory 30, which is shown in FIG. 12.

Figure 17:
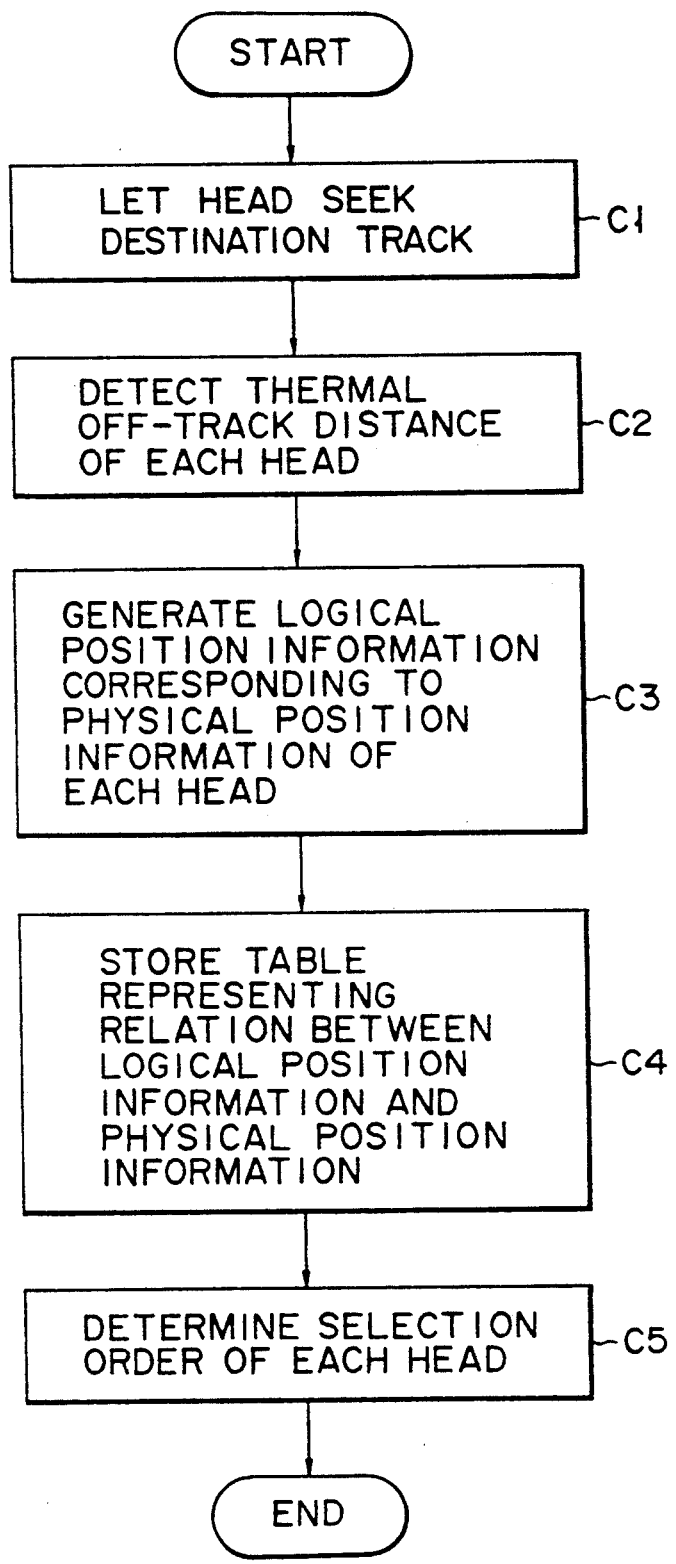
FIG. 17 is a flowchart for explaining the operation of the apparatus of the second embodiment of the invention.

The operation of the second embodiment will now be described with reference to the flowchart shown in FIG. 17.

Like the first embodiment, the CPU 17 causes the data heads H1 to H15 to seek destination tracks. In synchronism with the sector pulses SP from the servo control circuit 18, the CPU 17 receives the peak values P$^A$ and P$^B$ of the servo signals from the peak detecting circuit 15 through the A/D converter 16 (step C1). On the basis of equation (1) the CPU 17 calculates the current thermal off-track distance L of each data head H1 to H15 (step C2).

When the thermal off-track distances of the data heads H1 to H15 are detected, the CPU 17 forms a table in the memory 30 showing the relationship between the head numbers (physical position numbers) and the thermal off-track distances, as is shown in FIG. 13. Referring to the table shown in FIG. 13, when the allowable off-track distance is, for example, 2 $\mu$, the off-track distances between the adjacent heads H5 and H6, between H10 and H11, and between H14 and H15 are out of the allowable range. Thus, the CPU 17 finds logical head numbers (LH1 to LH15) which ma allow the off-track distance between adjacent heads to fall within the allowable range. In other words, the CPU 17 produces logical position data corresponding to the physical position data of the data heads H1 to H15, so as to cause the off-track distance between the adjacent heads to fall within the predetermined allowable off-track distance (step C3). The thus produced logical position data or logical head numbers (LH1 to LH15) are set in the table shown in FIG. 13.

The logical head numbers (LH1 to LH15) are set by the head selection signals $HD2^0$ to $HD2^3$ output from the HDC 19. On the basis of the table shown in FIG. 13, the CPU 17 allows the memory 30 to store a table showing the relationship between the head selection signals $HD2^0$ to $HD2^3$ and the head numbers (physical position numbers) as shown in FIG. 14 (step C4). Thereafter, when data write/read is continuously performed in the same cylinder, using the data heads H1 to H15, the CPU 17 determines the head selection order by referring to the table shown in FIG. 14 (step C5).

More specifically, when the CPU 17 outputs a "1"-level selection signal SE and the HDC 19 sequentially outputs head selection signals $HD2^0$ to $HD2^3$ corresponding to the logical head numbers (LH1 to LH15), the memory 30 outputs the head selection signal HS to the head control circuit 12, on the basis of the table of FIG. 14. The head selection signal HS corresponds to the physical head numbers (H1 to H15) designated by the head selection signals $HD2^0$ to $HD2^3$.

For example, as shown in FIG. 15, the head selection signal HS of the memory 30 comprises five signals D0 to D4. The head control circuit 12 comprises an amplifier 12a for the data heads H1 to H8 and an amplifier 12b for the data heads H9 to H15. The head control circuit 12 outputs to the LPF 13 the signal of the data head selected by the head selection signal HS consisting of the signals D0 to D4. When the values of the signals D0 to D2 are 0, 0, and 0, and the values of the signals D3 and D4 are 0, and 1, the data head H1 is selected. The signal of the data head H1 is supplied to the LPF 13 through the amplifier 12a. When the values of the signals D0 to D2 are 0, 0, and 0, and the values of the signals D3 and D4 are 1, and 0, the data head H9 is selected and the signal of the data head H9 is output to the LPF 13 through the amplifier 12b. FIG. 16 shows the relationship between the head selection signal HS (signals D0 to D4) and the head numbers.

As has been described above, the data heads H1 to H15 are selected in the logical order, such as H1, H2, H8, H12 . . . . Thus, it is ensured that the off-track distance between the adjacent heads, for example, H1 and H2, H2 and H8, and H8 and H12 . . . , falls within the allowable range. According to the second embodiment, when the data heads H1 to H15 are used to continuously perform the data read/write operation in the same cylinder, the heads can be switched to limit the off-track distance between adjacent heads within the allowable range. In other words, when the off-track distance between adjacent heads is out of the allowable range, it is necessary to position the heads for every single rotation of the recording mediums. In the second embodiment, since the head selection order is logically determined, the positioning control operation can be omitted. As a result, the time taken for the head positioning operation necessary for off-track correction can be decreased, and the throughput of the data recording/reproducing apparatus can be increased.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A data recording/reproducing apparatus, comprising
   at least one recording medium having on one side a serve surface including tracks for pre-storing servo data, and on the other side a data surface including tracks for reading/writing data;
   a first magnetic head for reading out the servo data from the servo surface of the recording medium;
   a second magnetic head for reading/writing data on the tracks of the data surface;
   means for moving the first and second magnetic heads relative to the recording medium, the second magnetic head being movable in conjunction with the first magnetic head;
   head positioning means for enabling the moving means to position the first magnetic head to a destination track on the servo surface, and to position the second magnetic head to a destination track on the data surface on the basis of the servo data read out from the servo surface by the first magnetic head;
   means for detecting an off-track distance L of the second magnetic head with respect to the destination track on the data surface, when the head positioning means has positioned the first magnetic head on the destination track of the servo surface;
   means for comparing the off-track distance L detected by the off-track distance detecting means with a first predetermined value Lw when in a data write mode and a second predetermined value Lc when in a data read mode; and
   control means for enabling the second magnetic head to perform a data write operation on the data surface unless the detected off-track distance L is greater than the first predetermined value Lw, and enabling the second magnetic head to perform a data read operation on the data surface unless the detected off-track distance L is greater than the second predetermined value Lc.

2. The apparatus according to claim 1, wherein servo data is recorded on the data surface, and the off-track distance detecting means detects the off-track distance L on the basis of the servo data red out from the data surface by the second magnetic head.

3. The apparatus according to claim 1, wherein the first predetermined value Lw is half the second predetermined value Lc.

4. The apparatus according to claim 1, wherein the control means enables the data write operation when $L \leq Lw$, and prohibits the data write operation when $L > Lw$.

5. The apparatus according to claim 1, wherein the control means prohibits both the data read operation and data write operation when $L > Lc$, enables the data read operation and prohibits the data write operation when $\frac{1}{2} Lc < L \leq Lc$, and enables both the data read operation and the data write operation when $L \leq \frac{1}{2} Lc$.

6. The apparatus according to claim 1, further comprising means for correcting the position of the second magnetic head when the control means prohibits the data write operation or the data read operation.

* * * * *